No. 628,053. Patented July 4, 1899.
P. R. WERNICKE.
PATTERN BOX.
(Application filed May 20, 1898.)

(No Model.) 2 Sheets—Sheet 1.

Witnesses:

Inventor:
Paul R. Wernicke
by: Eustace H. Hopkins
Att'y.

No. 628,053. Patented July 4, 1899.
P. R. WERNICKE.
PATTERN BOX.
(Application filed May 20, 1898.)
(No Model.) 2 Sheets—Sheet 2.

Witnesses:
Alfred Meister
Hugo Böhme.

Inventor:
Paul R. Wernicke
by: Eustace ...
Att'y.

UNITED STATES PATENT OFFICE.

PAUL REINHOLD WERNICKE, OF EILENBURG, GERMANY.

PATTERN-BOX.

SPECIFICATION forming part of Letters Patent No. 628,053, dated July 4, 1899.

Application filed May 20, 1898. Serial No. 681,247. (No model.)

*To all whom it may concern:*

Be it known that I, PAUL REINHOLD WERNICKE, a subject of the King of Saxony, and a resident of Eilenburg, Kingdom of Saxony, Germany, have invented certain new and useful Improvements in Pattern-Boxes, of which the following is a full, clear, and exact description.

The present invention consists of improvements in pattern-boxes for containing and distributing the various colors in the manufacture of patterned slabs of cement, clay, or other plastic material. These boxes are made with a series of partition-walls and an opening at the bottom, the said partition-walls forming the means for restricting each color to its respective area, and thus forming the pattern on the slab, which is afterward finished in the well-known manner. In working boxes of this kind difficulty has hitherto been experienced in getting the layer of color properly out at the bottom of the box, so as to form an even layer of the various colors, each space and all interstices being properly filled out by the proper color. If the color were pressed out from above, it got caked or clogged in the smaller interstices of the pattern-box and thus the pattern produced was incomplete. In any case only quite dry colors could be employed with any chance of success.

According to the present invention the colors are caused to fall evenly in a layer of the desired thickness by gently agitating them at the plane at which they leave the box by means of movable gratings or sieves, as hereinafter particularly described, and pointed out in the claims, and in order to render the present specification more easily intelligible reference is had to the accompanying drawings, in which similar letters of reference denote similar parts throughout the several views.

Figure 1:
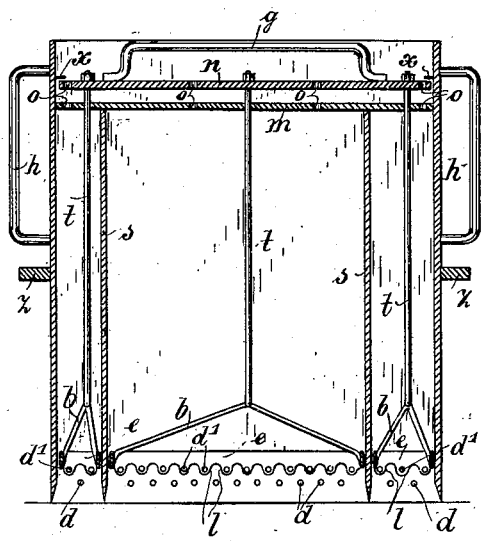
Figure 5:
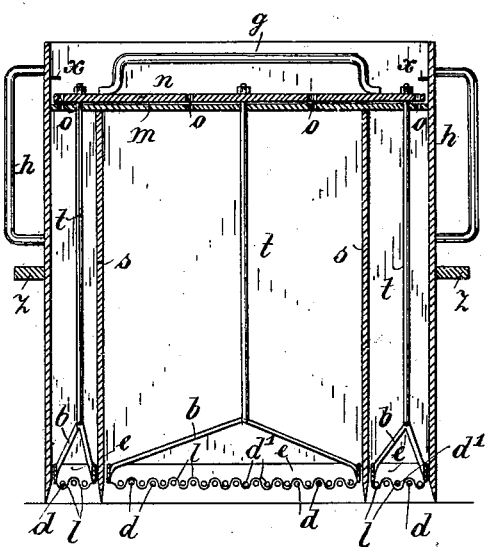
Figure 4:
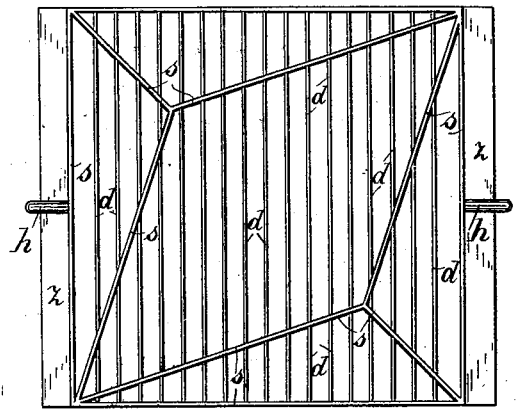
Figure 2:
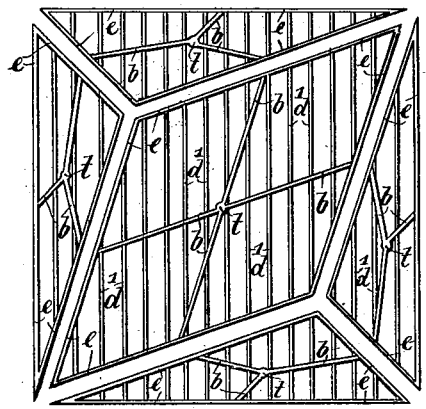
Figure 6:
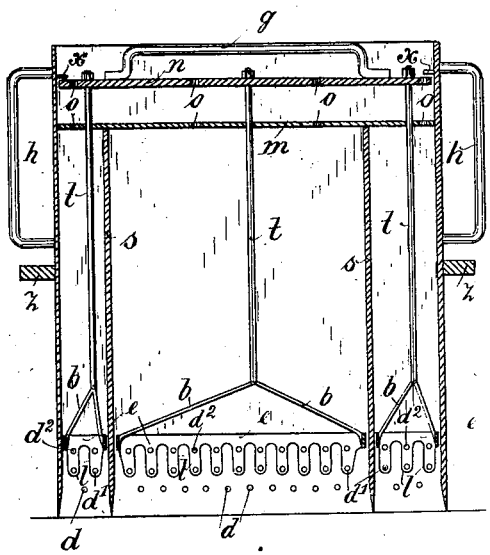
Figure 7:
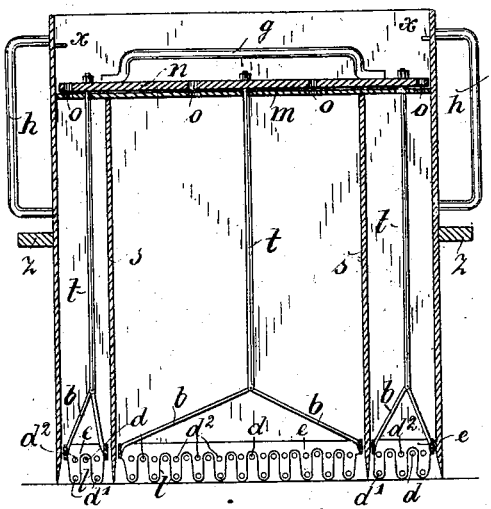
Figure 3:
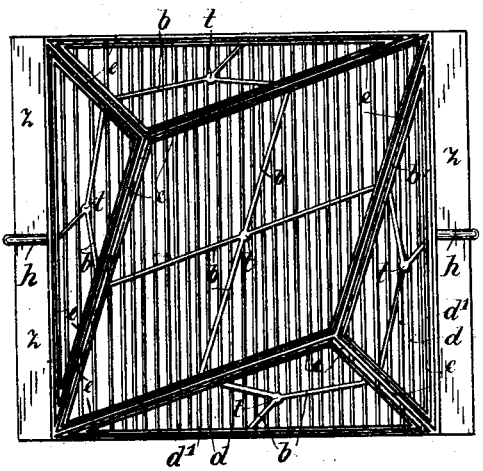
Figure 8:
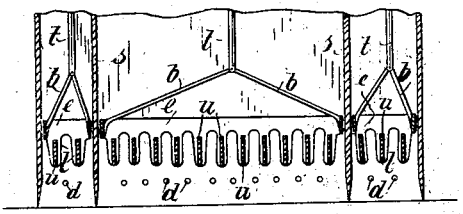
Figure 8:
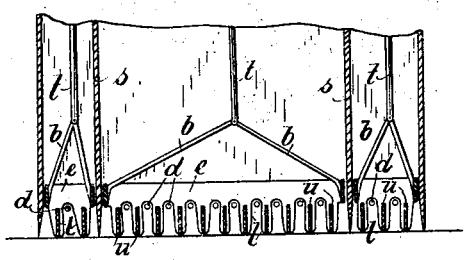

Figure 1 is a vertical section through a box constructed according to the present invention and showing the grating raised. Fig. 2 is a plan of the gratings for the various parts of the pattern; Fig. 3, a plan of the box with the gratings therein; Fig. 4, a plan of the box with the gratings removed; Fig. 5, a sectional elevation of the box with the grating down in its lowest position; Fig. 6, a sectional elevation of a box having a modified form of grating, said grating being in its raised position; Fig. 7, similar view to that of Fig. 6, with the grating lowered; and Fig. 8, two part-sectional elevations showing a modified form of grating in its raised and lowered positions, respectively.

As will be seen from Figs. 1 to 5, the box is divided into a series of compartments by means of walls $s$, the horizontal cross-sectional area of which forms the pattern. In the open bottom of the box a series of wires or bars $d\ d$ are fixed a short distance from the lower edge of the same. In each compartment thus formed a frame $e$, Fig. 2, fits, consisting of a light flat metal rim having bars stretched thereon, as at $d'$, said bars running parallel to those of the box and arranged to lie between the same and in a plane therewith when the said frames $e$ are in position in the box. Between the wires the lower edges of the frames are provided with a series of grooves $l\ l$, which engage over the wires or bars of the box and permit the bars or wires of the frames to pass down into the plane of the said box-bars, as seen at Fig. 5. Each frame $e$ is connected by arms $b$ to a vertical rod $t$, extending upwardly and passing through the cover $m$, fixed at the upper part of the box, and then through a movable plate $n$ in which all the said rods are fixed by means of nuts. The plates $m$ and $n$ are both provided with air-holes $o$, and the upper plate $n$ has a handle $g$ by means of which it, and with it the frames $e$, may be raised and lowered. The box has handles $h$ and a flange $z$, on which it may rest on suitable bearings when not in use, so as to prevent the sharp lower edges of the box from getting blunt, owing to the weight of the box continually resting on them.

In operation the compartments are filled with their respective colors. The pattern-box is then placed on the mold and the frames moved gently up and down, by which means the colors in the compartments will be loosened and fall through the gratings in an even layer and at all parts of the pattern.

The gratings are advantageously so dimensioned that when the gratings of the frames are in their lower positions and between the grating-bars of the bottom of the box no color will come through, so that in this position they form a bottom to the box, which may be moved from place to place without loosening the color. As soon as the frames are raised the color will be loosened and will fall through between the grating-bars of the bottom of the box. Stops $x$ are formed inside the box at the upper parts to prevent the plate $n$ from being raised too high, and the air-holes $o$ prevent the agitation of the colors within the box on the movement of the frames.

In the modification shown at Figs. 6 and 7 the frames $e$ are provided with a double row of wires or bars, the second row $d^2$ being above the first row $d'$ and the depressions $l\,l$ in the lower edges of the frames being deeper, so as to allow the lower row of bars $d'$ to pass between and below the bars of the box and extend almost to the level of the lower edge of the box when the frames are depressed, as shown at Fig. 7. By this means the color ejected from the box will be pressed down by the lower row of bars and to a certain extent fixed in position. In the modification shown at Fig. 8 the same effect is attained by means of flat bars $u$ on the frames, which pass down in a similar manner between the round bars of the bottom of the box. Obviously flat bars might also be employed at the bottom of the box. Then, again, instead of a series of bars sieves might be substituted, the degree of coarseness or fineness of said sieves being so chosen that when the sieves are down, one on the other, a bottom would be formed to the box similar to that at present formed by the bars. Instead of placing the wires or bars as described with reference to Figs. 1 to 5 the same might be crossed without departing from the nature of my invention.

I claim as my invention—

1. In a pattern-box having a series of color-compartments, the combination of a series of bars stretched across the bottom of said box, a series of frames in said compartments having grooves in their lower edges to pass over said box-bars and having bars to pass between said box-bars and means for vertically moving said frames substantially as described.

2. In a pattern-box, the combination of a series of bars stretched across the same approximately at the bottom thereof, a series of frames in each compartment, having grooves as specified each frame having a series of bars to pass between said box-bars, a cover fixed in the upper part of said box, a series of vertical rods attached to said frames and passing through said cover, means for connecting said rods outside said cover and for moving the same up and down substantially as described.

3. The combination of a pattern-box having color-compartments, a series of bars stretched across the same approximately at the bottom, a series of vertically-movable frames in said compartments, having grooves in their lower edges as specified and having bars to fit between said box-bars, said bars being of such thickness as to prevent the color from falling through, when they are lying between the bars of the box substantially as described.

4. In a pattern-box, the combination of a series of bars across the same approximately at the bottom, a series of frames mounted in the compartments and having grooves in their lower edges as specified, and having each two rows of superposed bars to fit between the box-bars and means for vertically moving said frames in the manner and for the purpose substantially as described.

In witness whereof I have hereunto set my hand in presence of two witnesses.

PAUL REINHOLD WERNICKE.

Witnesses:
RICHARD NÜRNBERGER,
MORITZ SPREER.